US006884175B2

(12) United States Patent
Toriyama et al.

(10) Patent No.: US 6,884,175 B2
(45) Date of Patent: Apr. 26, 2005

(54) VIDEO GAME WITH ADDITIVE TRANSLATION DICTIONARIES

(75) Inventors: Motomu Toriyama, Tokyo (JP); Takashi Katano, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 237 days.

(21) Appl. No.: 09/973,037

(22) Filed: Oct. 10, 2001

(65) Prior Publication Data

US 2003/0003998 A1 Jan. 2, 2003

(30) Foreign Application Priority Data

Jun. 29, 2001 (JP) ........................................ 2001-199990

(51) Int. Cl.[7] .............................................. A63F 13/00
(52) U.S. Cl. .......................................... 463/43; 463/29
(58) Field of Search ........................... 463/1–7, 40–45; 707/3–6; 700/91–93

(56) References Cited

U.S. PATENT DOCUMENTS

| 5,273,294 | A | * | 12/1993 | Amanai | 463/24 |
| 5,778,395 | A | | 7/1998 | Whiting et al. | |
| 5,971,856 | A | * | 10/1999 | Aoyama et al. | 463/43 |
| 6,009,458 | A | * | 12/1999 | Hawkins et al. | 709/203 |
| 6,475,084 | B1 | * | 11/2002 | Tanibuchi et al. | 463/3 |
| 6,527,641 | B1 | * | 3/2003 | Sinclair et al. | 463/39 |
| 6,623,360 | B1 | * | 9/2003 | Nakajima | 463/40 |

FOREIGN PATENT DOCUMENTS

| JP | 4167149 | 6/1992 |
| JP | 1049416 | 2/1998 |
| JP | 1176621 | 3/1999 |

OTHER PUBLICATIONS

English Language Abstract for JP Appln. No. 11–076621, together with an English Language Translation of [0035]–[0038].
English Language Translation for JP Appln. No. 10–49416.
English Language Abstract for JP Appln. No. 4–167149.

* cited by examiner

*Primary Examiner*—John M. Hotaling, II
(74) *Attorney, Agent, or Firm*—Greenblum & Bernstein, P.L.C.

(57) ABSTRACT

When starting a new game, saved translation dictionary data is selected and compared with other translation dictionary data. Based on the comparison result, translation dictionary parts differing from the saved translation dictionary parts are determined as un-obtained parts. Data corresponding to the un-obtained parts are then retrieved from the other translation dictionary data and stored in a predetermined area of a RAM as new translation dictionary data. Further, at a game start, translation dictionary data of saved data loaded at the beginning of a game and each of translation dictionary data in a memory card are compared. Based on the comparison result, translation dictionary parts differing from the saved translation dictionary parts are determined to be un-obtained parts. Data corresponding to the un-obtained parts are obtained from each of the translation dictionary data in the memory card and stored in a predetermined area of the RAM as new translation dictionary data.

12 Claims, 4 Drawing Sheets

VIDEO GAME WITH ADDITIVE TRANSLATION DICTIONARIES

CROSS REFERENCE TO RELATED APPLICATION

The present disclosure relates to subject matter contained in Japanese Patent Application No. 2001-199990, filed on Jun. 29, 2001, the disclosure of which is expressly incorporated herein by reference in its entirety.

BACKGROUND OF THE INVENTION

1. Field of the Invention

The present invention relates to video games. More specifically, the present invention relates to a video game processing device to which a memory card can be connected.

2. Description of the Related Art

Role playing games (called "RPG," hereinafter) are known as one of category video games using computers. Generally, in the RPG, a character plays a role instead of its player, and a story of the game develops while the player experiences pseudo adventure by manipulating the character (called "player character" hereinafter). In many cases, in each set zone formed in a virtual space, a player character and a character to fight against the player character (called "enemy character" hereinafter) are defined. The player character advances to each zone. There, the player character fights with an enemy character who prevents a goal in the story from being achieved. The story develops if the player character defeats the enemy character.

Notably, a player character is manipulated through a button on a keypad, a joystick, and so on. The player character moves and performs a predetermined operation in response to a manipulation given on the keypad. Further, many events such as a battle scene are arranged as the story develops. The game advances when the player performs selecting operations for those events.

Further, a device for processing a conventional RPG, to which a memory card can be connected is known, which allows for a game having been stopped during play to be restarted in the state that existed just before the interruption and allows the game to be started under the same condition, even in a video game processing device located in a different place. In such a device, various data and each kind of setting data created as the game advances may be stored in a memory card as saved data for several times as necessary.

However, in conventional video games, the memory card is used in a uniform and therefore ineffective manner. Further, if the player could not have obtained or forgot to obtain information playing an important role for advancing the game, for example, he/she only has to play the game from the beginning or from the scene near the interruption by reading out saved data, which may spoil the fun. Thus, a video game is desired which makes a memory card available for many purposes in order to advance a game efficiently.

SUMMARY OF THE INVENTION

The present invention was made in view of the above-described problem, and it is an object of the present invention for a game program to access a part of another information data within another Memory card slot (or from another memory card, or from another data carrying apparatus), to combine and form larger information data.

To better understand the invention, an RPG scenario is provided below describing an exemplary use of the invention. In this scenario, a player's character is guided by the player to a hypothetical base—the base of FF X.

FF X contains an incomprehensible language, spoken by some group of characters who might have a clue to a part of the story. The player can work out this language, gradually, by finding a part of "dictionary" within the game. For example, a character may say "jgnnq." At the beginning of the story, the player has no idea what this character is trying to say. However, if the player finds the part of the dictionary defining "jgnnq," the player will be able to understand part of the language. For example, the player may find dictionary no. 1, which says to convert "g" to "e" and "n" to "l." From that point on, the player will be able to read part of their language, for example "jgnnq" can now be converted to "jellq." If the player finds another dictionary (for example dictionary no. 3), the player will be able to understand more of the language by adding on (or combining the dictionaries) to the already known information. If dictionary no. 3 says to convert "j" to "h" and "q" to "o", the player will be able to understand the four letters "g, n, j, q" as "e, l, h, o." As a result, "jgnnq" will be read as "hello".

In this scenario, the dictionary information in the application is called the "translation dictionary data". However, this does not have to be a "dictionary data," but could be any kind of data within the game. The data may be separately memorized within the memory card from other game data, or at least, should be able to access the information from the game program. The game program combines this partial data to form a larger data which could influence the progression of the game. For example, player A plays the game and finds dictionary no. 1 and 3, and saves his game on memory card block no. 15. Player B plays and finds dictionary no. 1 and 2, and saves his game on Memory card block no. 17. According to the invention, player B may come to a point in the game where he is able to combine his Memory card data with A's to have more dictionary data. If player B wishes to do so, the game program will read out the other "translation dictionary data" within his Memory card, from another Memory card such as A's, or from another data carrying apparatus, and compare it with player B's data of block no. 17. If the program finds new data such as Player A's data from block no. 15 of dictionary no. 3, the new data will be added to the Memory card block no. 17. Then, player B will be able to read the information of dictionary no. 1 through 3, without finding it for himself.

A first aspect of the present invention is a computer-readable recording medium on which a video game program is recorded in a video game processing device to which a memory card can be connected. The program causes a computer to write saved data including acquired information acquired as the game advances in the memory card in response to player's manipulation and compare each piece of acquired information of the saved data written in the memory card with acquired information maintained in an internal memory of the video game processing device in response to player's manipulation. The computer also, based on a comparison result, obtains a not yet obtained or "new" part of the acquired information maintained in the internal memory from the acquired information of the saved data written in the memory card.

According to the first aspect, a recording medium can be provided whereby the memory card can be used for many purposes and the game can advance efficiently. Thus, the reduction of interest can be prevented.

According to the first aspect, the acquired information included in the saved data may be translation dictionary data. Thus, the recording medium can be provided whereby only the not yet obtained or "new" part of required information can be easily obtained from the memory card without actually playing, which prevents spoiling the fun.

According to the first aspect, the program may be recorded to cause the computer to write predetermined saved data in the memory card into the internal memory of the video game processing device. Thus, the recording medium can be provided by which the game can be re-started under the same condition, and only the not yet obtained or "new" part of required information can be easily obtained from the memory card without actually playing.

A second aspect of the present invention is a video game program in a video game processing device to which a memory card can be connected, the program causing a computer to execute the steps of writing saved data including acquired information acquired as the game advances in the memory card in response to player's manipulation, comparing each of acquired information of the saved data written in the memory card with acquired information maintained in an internal memory of the video game processing device in response to player's manipulation, and, based on a comparison result from the comparison step, obtaining a not yet obtained or "new" part of the acquired information maintained in the internal memory from the acquired information of the saved data written in the memory card.

According to the second aspect, the memory card can be used for many purposes and a game can be advanced efficiently. Thus, the reduction of interest can be prevented.

According to the second aspect, the acquired information included in the saved data may be translation dictionary data. Thus, only the not yet obtained or "new" part of required information can be obtained from the memory card easily without actually playing, which allows the prevention of the reduction of interest.

According to the second aspect, the program may cause the computer to execute the step of writing predetermined saved data in the memory card into the internal memory of the video game processing device may be further executed. Thus, the game can be re-started under the same condition, and only the not yet obtained or "new" part of required information can be obtained from the memory card easily without actually playing.

A third aspect of the present invention is a video game processing method in a video game processing device to which a memory card can be connected, including the steps of writing saved data including acquired information acquired as the game advances in the memory card in response to player's manipulation, comparing each of acquired information of the saved data written in the memory card with acquired information maintained in an internal memory of the video game processing device in response to player's manipulation, and, based on a comparison result from the comparison step, obtaining a not yet obtained or "new" part of the acquired information maintained in the internal memory from the acquired information of the saved data written in the memory card.

According to the third aspect, the memory card can be used for many purposes and a game can advance efficiently. Thus, the reduction of interest can be prevented.

According to the third aspect, the acquired information included in the saved data may be translation dictionary data. Thus, only the not yet obtained or "new" part of required information can be easily obtained from the memory card without actually playing, which allows the prevention of spoiling the fun.

The third aspect may further include the step of writing predetermined saved data in the memory card into the internal memory of the video game processing device. Thus, the game can be re-started under the same condition, and only the not yet obtained or "new" part of required information can be easily obtained from the memory card without actually playing.

A fourth aspect of the present invention is a video game processing device, including a memory unit for storing a video game program in the video game processing device to which a memory card can be connected, a computer for executing the program read out from the memory unit, and a display device for screen display, which is provided as an output unit of the computer. In this case, the computer executes the program so as to write saved data including acquired information acquired as the game advances in the memory card in response to player's manipulation, to compare each of acquired information of the saved data written in the memory card with acquired information maintained in an internal memory of the video game processing device in response to player's manipulation, and, based on a comparison result from the comparison, to obtain a not yet obtained or "new" part of the acquired information maintained in the internal memory from the acquired information of the saved data written in the memory card.

According to the fourth aspect, the memory card can be used for many purposes and a game can be advanced efficiently. Thus, spoiling the fun can be prevented.

According to the fourth aspect, the acquired information included in the saved data may be translation dictionary data. Thus, only the not yet obtained or "new" part of required information can be easily obtained from the memory card without actually playing, which allows the prevention of the reduction of interest.

According to the fourth aspect, the computer may further write predetermined saved data in the memory card into the internal memory of the video game processing device. Thus, the game can be re-started under the same condition, and only the not yet obtained or "new" part of required information can be easily obtained from the memory card without actually playing.

DESCRIPTION OF THE PREFERRED EMBODIMENTS

Figure 1:
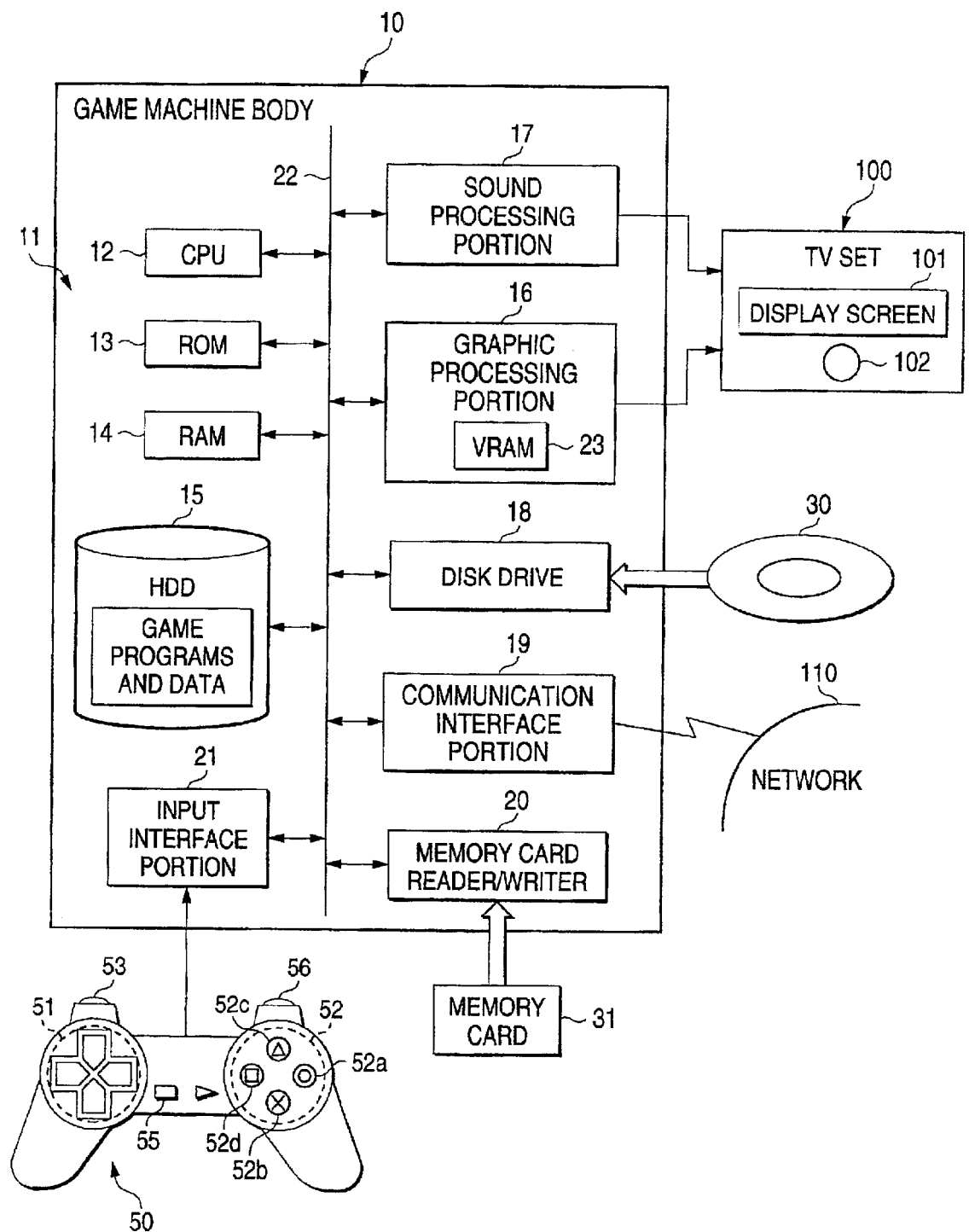
FIG. 1 is a block diagram showing an overall system according to one embodiment of the present invention.

An embodiment of the present invention will be described below with reference to the attached drawings. FIG. 1 is a block diagram showing an overall system of one embodiment of the present invention.

First, a video game machine according to one embodiment of the present invention will be described. A game machine 10 includes a game machine body 11 and a keypad 50 connected to an input side of the game machine body 11. Further, a television set 100 having a cathode ray tube (CRT), a speaker, and so on is connected to an output side of the game machine body 11.

The game machine body 11 includes a central processing unit (CPU) 12, a read only memory (ROM) 13, a random access memory (RAM) 14, a hard disk drive 15, a graphics processing portion 16, a sound processing portion 17, a disk drive 18, a communications interface portion 19, a memory card reader/writer 20, an input interface portion 21 and a bus 22 for connecting the components to each other. Further, the game machine body 11 is connected to the keypad 50 to which a manipulation is input via the input interface potion 21.

A cross key 51, a button group 52, and so on are placed on the keypad 50. The button group 52 includes a circle button 52a, a cross button 52b, a triangle button 52c, and a square button 52d. Further, a select button 55 is placed on a joint portion between a base portion on which the cross key 51 is placed and a base portion on which the button group 52 is placed. Notably, several buttons such as an R1 button 56 and an L1 button 53 are placed at the side of the keypad 50.

The keypad 50 includes switches for cooperating with the cross key 51, the circle button 52a, the cross button 52b, the triangle button 52c, the square button 52d, the select button 55, the R1 button 56, the L1 button 53, and so on, respectively. When pressure is applied to each button, a corresponding switch is turned ON. A detecting signal in response to ON or OFF of the switch is created in the keypad 50.

The detecting signal created in the keypad 50 is supplied to the input interface portion 21, and by passing through the input interface 21 the detecting signal from the keypad 50 becomes detecting information indicating which button on the keypad 50 is turned ON. Accordingly, a manipulation instruction which a user gives through the keypad 50 is supplied to the game machine body 11.

The CPU 12 executes an operating system stored in the ROM 13 in order to control the entire device extensively. Further, the CPU 12 executes a video game program stored in the program area of the RAM 14. Furthermore, the CPU 12 monitors a manipulation state of the keypad 50 through the input interface 21 in order to execute the video game program stored in the program area of the RAM 14 as necessary and to store various data derived from the developing processing of the game in a predetermined area of the RAM 14 as necessary. The ROM 13 includes an electrically erasable and programmable read only memory (EEPROM). Predetermined data in the RAM 14, which requires to be maintained during power OFF, is stored in the EEPROM before the power is shut down.

The RAM 14 mainly has a program area, an image data area, an audio data area, and an area for storing other data. Program data, image data, audio data, and other data read from the disk 30 such as a DVD and a CD-ROM by the disk drive 18 are stored in those areas, respectively.

Further, the RAM 14 is used as a working area, and various data derived from developing processes of the game are stored in the area for storing other data. Notably, the program data, the image data, the audio data and other data read from the disk 30 may be stored in the hard disk drive 15. The program data, the image data, the audio data, and other data stored in the hard disk drive 15 may be transferred to the RAM 14 as necessary. Further, various data derived from the developing processes of the game, which is stored in the RAM 14, may be transferred and stored in the hard disk drive 15.

The graphics processing portion 16 includes a frame buffer as a buffer memory for storing image data in the VRAM 23. The graphics processing portion 16 creates video signals based on image data stored in the frame buffer in accordance with control information from the CPU 12 involved in the program execution, and then outputs the video signals to the television set 100. Thus, the image data stored in the frame buffer is displayed on the screen display portion 101 of the television set 100.

The sound processing portion 17 has a function for creating audio signals such as background music, conversations between characters, and sound effects. The sound processing portion 17 outputs sound signals including audio signals from the speaker 102 of the television set 100 based on data stored in the RAM 14 in accordance with the control information from the CPU 12 involved in the program execution.

The television set 100 has the screen display portion 101 and the speaker 102 and performs video (image) display and audio output in accordance with contents of a video game based on video signals and/or sound signals from the game machine body 11.

The disk drive 18 is arranged so as to allow the disk (DVD or CD-ROM) 30 that is a recording medium to be attached removably therein. The disk drive 18 reads program data, image data, audio data, and other data of a video game stored in the disk 30.

The communications interface portion 19 is connected to the network 110 in order to obtain different kinds of data by communicating data between a data storage device such as a server located in another place and an information processing device. Notably, the program data, image data, audio data, and other data of the video game stored in the above-described RAM 14 may be obtained through the network 110 and the communications interface portion 19.

The memory card reader/writer 20 is arranged to allow the memory card 31 to be attached removably. The memory card reader/writer 20 writes in the memory card 31 a smaller amount of data such as saved data on a video game in progress and environment-setting data for the video game.

A video game program in a video game processing device to which a memory card can be connected is recorded in a recording medium according to one embodiment of the present invention, namely, the disk 30, and can be read out by a computer (the CPU 12 and peripheral devices thereof). The computer can write saved data including acquired information acquired as the game advances in the memory card 31 in response to player's manipulation. The computer can also compare each piece of acquired information of the saved data written in the memory card 31 with acquired information maintained in the RAM 14, in response to player's manipulation. Based on the comparison result, the computer can obtain a not yet obtained or "new" part of the acquired information maintained in the RAM 14 from the acquired information of the saved data written in the memory card 31. Further, the computer can write predetermined saved data from the memory card 31 into the RAM 14.

Accordingly, the game machine body 11 includes functions required for implementing a conventional video game through software processing based on data stored in memories in the CPU 12 and in each part, and further includes, as distinctive functions, the functions of writing saved data including acquired information acquired as the game advances in the memory card 31 in response to player's manipulation, and comparing each piece of acquired information of the saved data written in the memory card 31 with acquired information maintained in the RAM 14 in response to player's manipulation. Based on a comparison result, a not yet obtained or "new" part of the acquired information maintained in the RAM 14 is obtained from the acquired information of the saved data written in the memory card 31. Further, the game machine body 11 includes the function of writing predetermined saved data in the memory card 31 into the RAM 14.

Thus, a video game is implemented which makes a memory card available for many purposes in order to advance a game efficiently and can prevent spoiling the fun. These functions may be implemented by using dedicated hardware rather than software processing.

Figure 2:
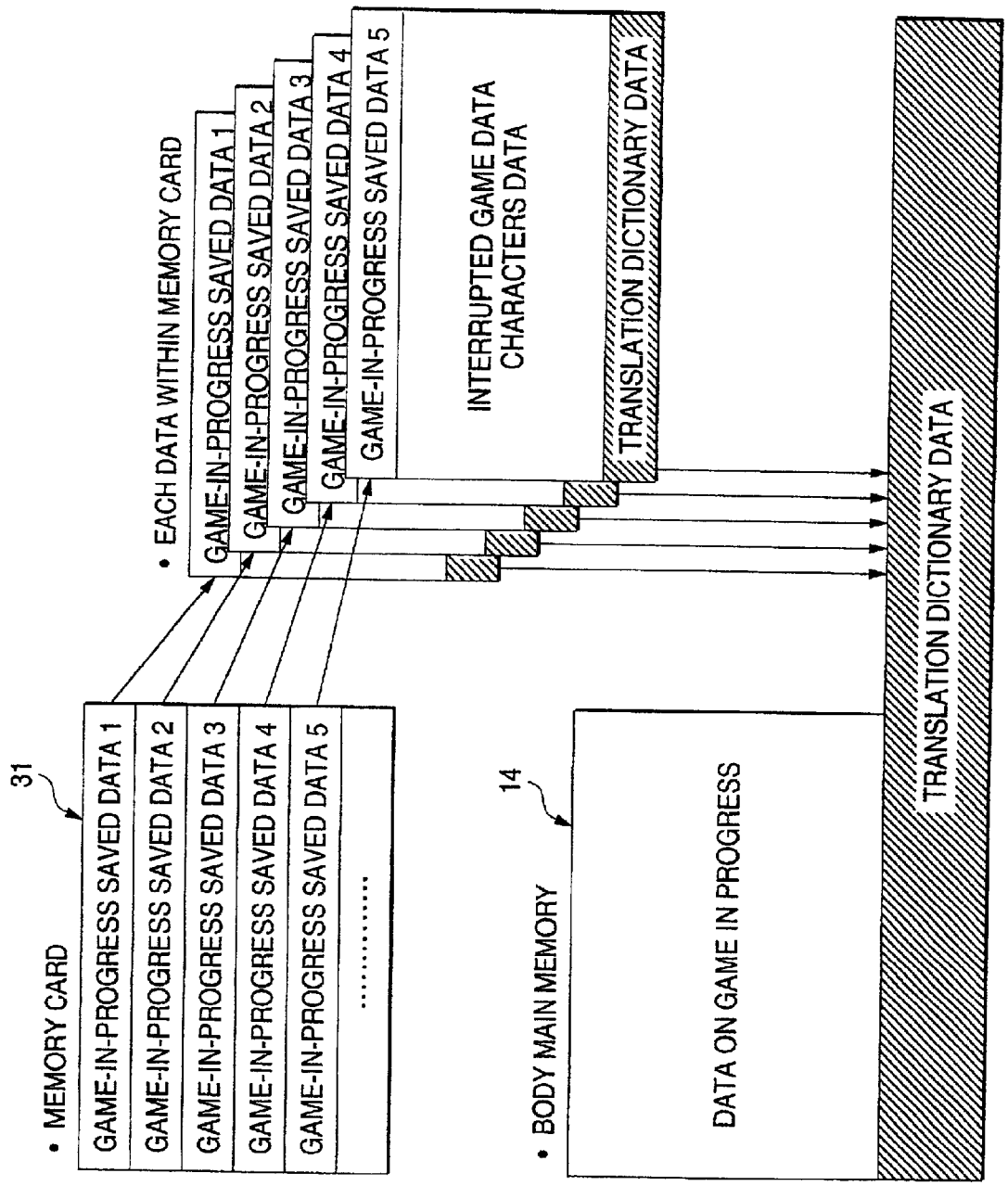
FIG. 2 is a diagram showing conceptually a distinctive part of operations according to one embodiment of the present invention.
Figure 3:
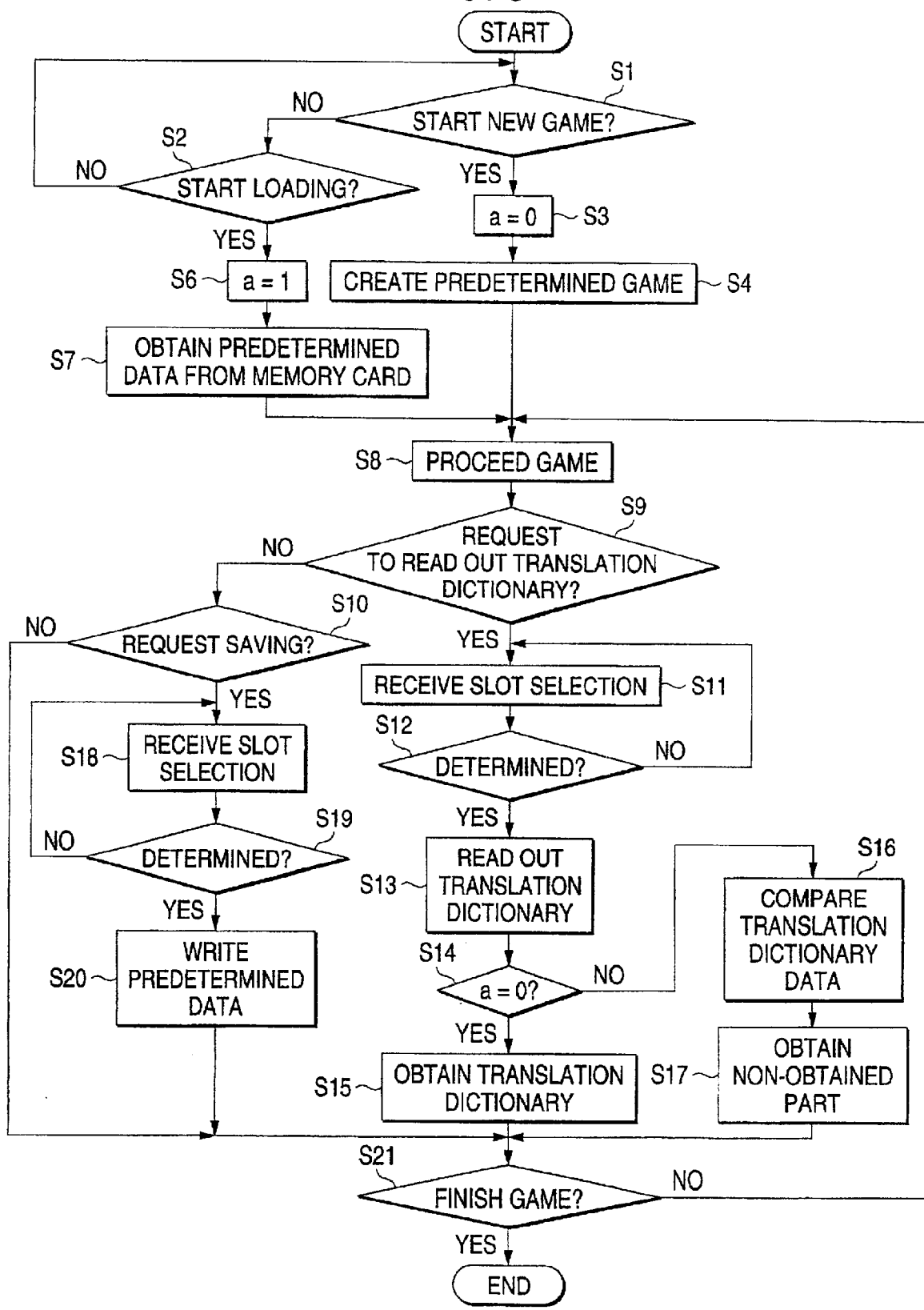
FIG. 3 is a flowchart used for describing overall operations of one embodiment of the present invention.

Next, an operation according to one embodiment, which is arranged as described above, will be described. FIG. 2 is an explanatory diagram conceptually showing a distinctive part of the operation according to the above-described embodiment. Further, FIG. 3 is a schematic flowchart, which is one example showing processing steps of an overall operation according to the above-described embodiment. Notably, respective steps in FIG. 3 are given reference numerals such as steps S1 to S21.

The operation according to the above-described embodiment will be described with reference to FIG. 2. Several game-in-progress saved data are stored in the memory card 31 as shown in FIG. 2. In this description, each game-in-progress saved data (simply called "saved data" hereinafter) includes interrupted-game data, character data, and translation dictionary data obtained as the game advances.

The game data includes information indicating a point where the game takes place, a current position of a player character and so on. The character data includes information indicating a state of each character, such as each parameter and different kinds of setting information. The translation dictionary data is data for translating a virtual language used in the game advancing process.

On the other hand, data on a currently advancing game and translation dictionary data acquired as the game advances are stored in a predetermined data area in a main memory (RAM 14) of the game machine body 11. When a request for reading out the translation dictionary occurs in the game advancing process, corresponding parts of translation dictionary data of each saved data and the translation dictionary data in the main memory, respectively, are compared in order to obtain a not yet obtained or "new" part of the translation dictionary data in the main memory from the translation dictionary data in the memory card 31 based on the comparison result. Accordingly, only the not yet obtained or "new" part of required information can be easily obtained from the memory card without actually playing.

Next, an overall operation of one embodiment having such a feature will be described with reference to FIG. 3. First of all, though omitted in FIG. 3, when the power is turned on, a boot program is read out. Then, each part is initialized and processing for starting a game is performed. In other words, program data, image data, audio data, and other data of a video game stored in the disk (DVD or CD-ROM) 30 is read by the disk drive 18, and each data is stored in the RAM 14. Further, if necessary, predetermined data stored in the EEPROM of the ROM 13, the hard disk drive 15, or a writable non-volatile memory such as the memory card 31 is read out and stored in the RAM 14.

Then, each setting is performed before actually starting the game and the process goes to step S1. In step S1, it is determined whether or not a new game start is selected. If it is determined that the new game start is not selected, the process goes to step S2, where it is determined whether or not a load start is selected. If it is determined that the load start is not selected, the process returns to step S1 again. Then, steps S1 and S2 are repeated and the process enters into a waiting state.

During the waiting state, if it is determined that the new game start is selected in step S1, the process goes to step S3, where a parameter "a" for control is set to 0. Then, the process goes to step S4, where predetermined data is created and written in the working area in the RAM 14. Then, the process goes to S8, where the game is ready to start. Notably, here, translation dictionary data acquired as the game advances is, of course, not obtained.

Further, during the waiting state where steps S1 and S2 are repeated, if it is determined that the load start is selected in step S2, the process goes to S6, where the parameter "a" for control is set to 1 (one). Then, the process goes to step S7, where predetermined data selected among saved data stored in the memory card 31 is read and written in the working area of the RAM 14. Then, the process goes to step S8, where the game is ready to start. Notably, here, the translation dictionary data acquired as the game advances is included in the read saved-data.

When the process goes to step S8 and the game advances, one scene such as a moving scene, a battle scene or other scenes occurs, where each corresponding processing is performed. For example, in the moving scene, the process enters a state for receiving movement manipulation. In accordance with received movement manipulation, movement processing is performed. Movement information is created based on position information of a player character derived in response to the movement processing.

In the battle scene, the process enters a state for receiving a battle manipulation. In step S8, battle processing is performed in accordance with received battle manipulation. Then, various information is created in accordance with battle processing. Further, in another scene (such as conversation, shopping or finding), processing corresponding to each scene is performed, and other various information are created in accordance with the processing.

As described above, the various information created in accordance with each scene is stored in the RAM 14, and action evaluation processing is performed based on the various information. Specifically, information requiring digitizing is digitized by using a prepared conversion table. If weighting is required, a predetermined coefficient is multiplied. Then, those values are added up so as to calculate a score. Then, the calculated score is added to an old score having been kept in a predetermined data area of the RAM 14, which is then stored in the predetermined data area again. Thus, the score, that is evaluation information, is updated as necessary.

As the game advances in this way, and when the player character moves a predetermined setting zone and approaches a predetermined indicator placed within the screen, for example, the game is interrupted and the process goes to step S9. In step S9, it is determined whether or not a request for reading out translation dictionary data occurred. If it is determined that the request for reading out translation dictionary data did not occur, the process goes to step S10. In step S10, it is determined whether or not a save request occurred. If it is determined that the save request did not occur, the process goes to step S21 without any processing. In step S21, it is determined whether or not the game is finished. If it is determined that the game is not finished, the process returns to step S8 and the game continues to advance. Otherwise, the processing ends.

On the other hand, in step S9, if it is determined that the request for reading out translation dictionary data occurred, the process goes to step S11, where the process gets ready to receive a selection of slots for connecting to the memory card. Then, in step S12, it is determined whether or not a confirmation manipulation has completed. The process goes to step S13 only if it is determined that the confirmation manipulation has completed. Otherwise, the processing returns to step S11.

Figure 4:
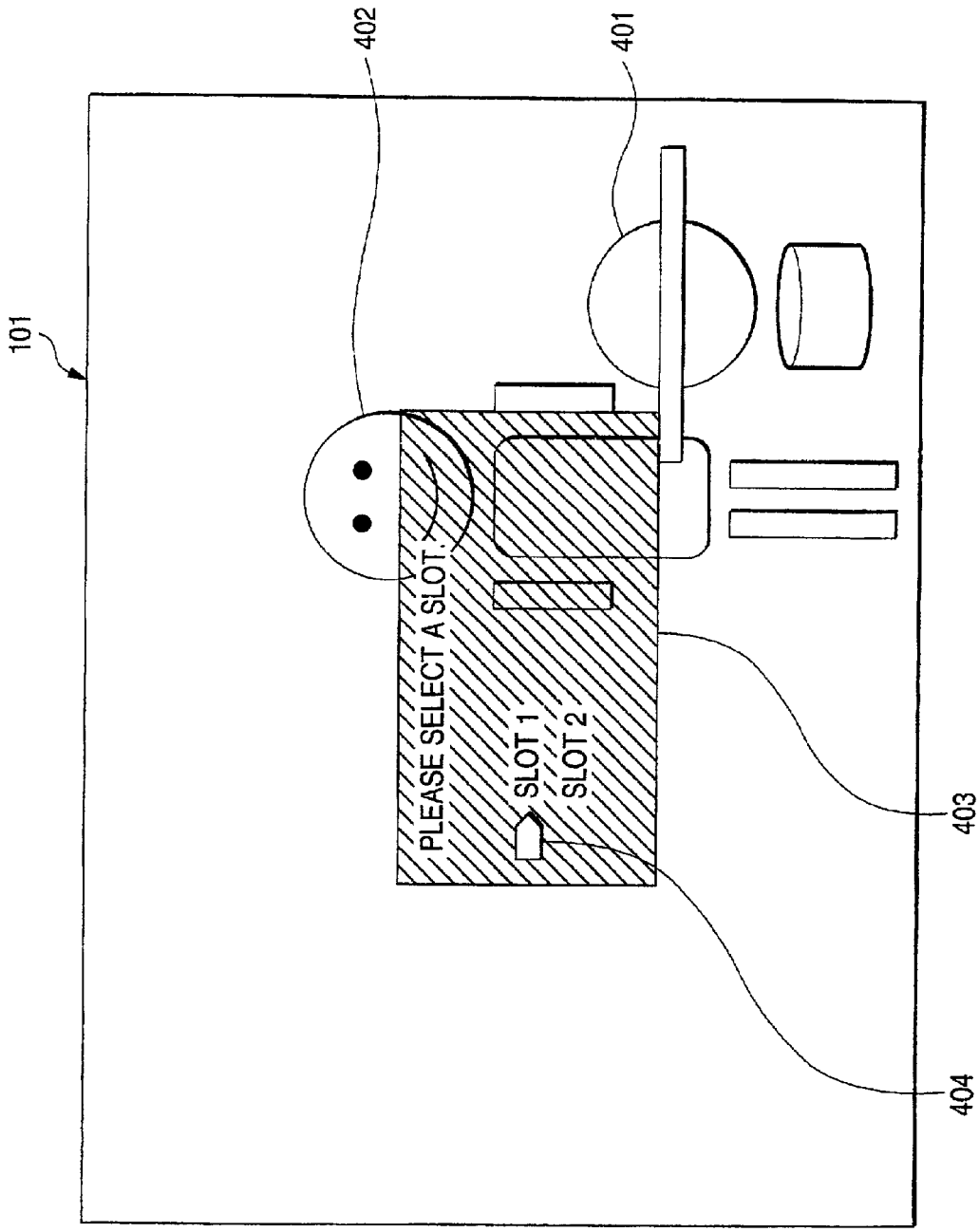
FIG. 4 is a diagram showing one example of a displayed screen according to one embodiment of the present invention.

FIG. 4 shows one example of a displayed screen at the time when the request for reading out translation dictionary data has occurred. An indicator having a function for interrupting the game and then moving to data-writing/reading processing is designated as 401 in FIG. 4. Further, the player character is designated as 402 in FIG. 4.

As shown in FIG. 4, when the player character 402 approaches to a predetermined distance to the indicator 401, the game is interrupted temporally. If a request for reading out translation dictionary data occurs in response to player's manipulation, a game score, or the like, a window 403 is opened substantially at the center of the displayed screen as shown in FIG. 4, which displays a comment and slot selections. The slot selecting manipulation is performed by moving a cursor 404 through the cross key 51 and then pressing the circle button 52a at a predetermined position near "slot 1" or "slot 2". Then, it is determined from the action that the confirmation manipulation has been performed, and the process goes to step S13.

In step S13, each piece of translation dictionary data in the saved data stored in the memory card 31 is read out. Then, in step S14, it is determined whether or not the control parameter is (a=0). If (a=0), that is, if a new game start is instructed, each piece of translation dictionary data in the saved data is written in the RAM 14 once.

Then, one piece of translation dictionary data in the written saved data is selected and compared with the other translation dictionary data. If a different part is found and determined as a not yet or "new", data corresponding to the part is obtained from the other translation dictionary data, and new translation dictionary data is created. The created translation dictionary data is stored in a predetermined area for storing translation dictionary data in the RAM 14. Then, the process goes to step S21. There, it is determined whether or not the game is finished. If it is determined that the game is not finished, the process returns to step S8 again. Then, the game continues to advance. Otherwise, the processing ends.

In step S14, if it is determined that the control parameter is not (a=0), that is, if a load start is instructed, the process goes to step S16. In step S16, translation dictionary data in saved data loaded at the time of starting the game and each of translation dictionary data in the memory card 31 are compared. There, a different part is determined as a not yet or "new". In step S17, the not yet or "new" data in accordance with the determination result is obtained from each piece of translation dictionary data and then new translation dictionary data is created. Then, the created translation dictionary data is stored in a predetermined area for storing translation dictionary data in the RAM 14. The process goes to step S21, where it is determined whether or not the game is finished. If the game is not finished, the process returns to step S8 again. Then, the game continues to advance. Otherwise, the processing ends.

On the other hand, in step S10, if it is determined that a save request has occurred, the process goes to step S18, where the process gets ready to receive a selection of slots for connecting to the memory card. Then, in step S19, it is determined whether or not a confirmation manipulation has been completed. The process goes to step S20 only if it is determined that the confirmation manipulation has been completed. Otherwise, the process returns to step S18.

In step S20, each piece of data (such as interrupted game data, character data, and translation dictionary data acquired as the game advances) at the current position of the player character is written in the memory card 31 as saved data such that the progress at that time can be reproduced. Once the data has been written in the memory card 31, the process goes to step S21, where it is determined whether or not the game is finished. If it is determined that the game is not finished, the process returns to step S8 again, and then, the game continues to advance. Otherwise, when it is determined that the game is finished, the processing terminates.

As described, the first embodiment of the invention provides several advantages. For example, a memory card can be utilized for multiple purposes while a game can be efficiently advanced and the user's pleasure can be maintained. In addition, the game can be re-started under the same conditions as before, and only a not yet or "new" necessary part of translation dictionary data can be easily acquired from the memory card without actually playing the game. This also helps prevent spoiling the fun.

Next, another embodiment will be described. In the above described embodiment, reading out data from the memory card and creating data in the internal memory are executed in order to obtain translation dictionary data. However, the processing may be also applied to obtain other various data acquired as a game advances.

Further, in the above-described embodiment, a request for reading out translation dictionary data occurs when the player character approaches the indicator having a function for performing data writing/reading processing in response to player's predetermined manipulation, or when the game score is equal to or higher than a predetermined value. However, a function may be given to a predetermined button such that reading out the translation dictionary data from the memory card and creating the translation dictionary data in the internal memory can be performed as required. Further, it may be arranged that a request for reading out translation dictionary data occurs in relation to different kinds of information caused as the game advances rather than game scores.

Further, in the above-described embodiment, requested data is transferred without any processing when a request for reading out data simply occurs in the game machine body. However, information indicating prohibition of data readout may be given to saved data stored in the memory card such that a request for data readout from the game machine body can be denied in order to manage written saved data.

Notably, the present invention is not limited to each of the above-described embodiments. It is apparent that each of the embodiments may be modified as necessary without departing from the technical idea of the present invention. For example, steps in the method according to the present invention may be changed in order without departing from the principal or the scope of the present invention. Furthermore, similar reference numerals are given to similar components in each of figures.

What is claimed is:

1. A computer-readable recording medium on which a video game program is recorded in a video game processing device to which a memory card can be connected, said program causing a computer to execute:

writing saved data, including acquired information acquired as the game advances, interrupted-game data, and character data, in said memory card in response to a player's manipulation, the acquired information being accessible separately from the interrupted-game data and character data;

comparing only each piece of acquired information of said saved data written in said memory card, with acquired information maintained in an internal memory of said video game processing device in response to the player's manipulation; and obtaining a new piece of said acquired information from said acquired information written in said memory card, based on a comparison result.

2. The computer readable recording medium according to claim 1, wherein said acquired information included in said saved data is translation dictionary data.

3. The computer readable recording medium according to claim 1, said program further causing said computer to execute writing predetermined saved data in said memory card into said internal memory of said video game processing device.

4. A video game program in a video game processing device to which a memory card can be connected, said program causing a computer to execute:

writing saved data, including acquired information acquired as the game advances, and interrupted-game data, in said memory card in response to a player's manipulation, the acquired information being accessible separately from the interrupted-game;

comparing only each piece of acquired information of said saved data written in said memory card with acquired information maintained in an internal memory of said video game processing device in response to the player's manipulation; and obtaining a new piece of said acquired information from said acquired information written in said memory card, based on a comparison result.

5. The program according to claim 4, wherein said acquired information included in said saved data is translation dictionary data.

6. The program according to claim 4, said program further causing said computer to execute writing predetermined saved data in said memory card into said internal memory of said video game processing device.

7. A video game processing method to which a memory card can be connected, comprising:

writing saved data, including acquired information acquired as the game advances, interrupted-game data, and character data, in said memory card in response to a player's manipulation, the acquired information being accessible separately from the interrupted-game data and character data;

comparing only each piece of acquired information of said saved data written in said memory card with acquired information maintained in an internal memory of said video game processing device in response to the player's manipulation; and obtaining a new piece of said acquired information from said acquired information written in said memory card, based on a comparison result.

8. The video game processing method according to claim 7, wherein said acquired information included in said saved data is translation dictionary data.

9. The video game processing method according to claim 7, further comprising writing predetermined saved data in said memory card into said internal memory of said video game processing device.

10. A video game processing device, comprising:

a memory system that stores a video game program in said video game processing device to which a memory card can be connected;

a computer that executes said program read out from said memory system; and a display device for screen display, which is provided as an output system of said computer, wherein said computer executes said program so as to write saved data, including acquired information acquired as the game advances and interrupted-game data, in said memory card in response to player's manipulation, the acquired information being accessible separately from the interrupted-game data, to only compare each piece of acquired information of said saved data written in said memory card with acquired information maintained in an internal memory of said video game processing device in response to a player's manipulation, and, based on a comparison result from said comparison, to obtain a new piece of said acquired information from said acquired information written in said memory card.

11. The video game processing method according to claim 10, wherein said acquired information included in said saved data is translation dictionary data.

12. The video game processing device according to claim 10, wherein said computer further writes predetermined saved data in said memory card into said internal memory of said video game processing device.

* * * * *